(12) United States Patent
Tacke

(10) Patent No.: US 9,687,890 B2
(45) Date of Patent: Jun. 27, 2017

(54) FLUID COLLECTION SYSTEM AND RELATED METHODS

(71) Applicant: Independence Enterprises, Inc, Rock Springs, WY (US)

(72) Inventor: Michael D. Tacke, Rock Springs, WY (US)

(*) Notice: Subject to any disclaimer, the term of this patent is extended or adjusted under 35 U.S.C. 154(b) by 760 days.

(21) Appl. No.: 14/188,310

(22) Filed: Feb. 24, 2014

(65) Prior Publication Data

US 2014/0165326 A1 Jun. 19, 2014

Related U.S. Application Data

(62) Division of application No. 13/160,039, filed on Jun. 14, 2011, now abandoned.

(51) Int. Cl.
| | |
|---|---|
| A47L 9/16 | (2006.01) |
| B08B 5/04 | (2006.01) |
| E01H 1/08 | (2006.01) |
| B04C 5/13 | (2006.01) |
| B04C 5/14 | (2006.01) |
| B01D 50/00 | (2006.01) |

(52) U.S. Cl.
CPC ............. B08B 5/04 (2013.01); B04C 5/13 (2013.01); B04C 5/14 (2013.01); E01H 1/0836 (2013.01); B01D 50/002 (2013.01)

(58) Field of Classification Search
CPC   A47L 9/16; B08B 5/04; E01H 1/0836; B04C 5/13
USPC ........................................ 15/340.1, 347, 352
See application file for complete search history.

(56) References Cited

U.S. PATENT DOCUMENTS

| | | |
|---|---|---|
| 1,704,043 A | 3/1929 | Green |
| 3,172,143 A | 3/1965 | Yucis et al. |
| 3,605,170 A | 9/1971 | Hank et al. |
| 3,662,427 A | 5/1972 | Hanna |
| 3,675,267 A | 7/1972 | Klawitter |
| 3,744,653 A | 7/1973 | Jensen |
| 3,808,632 A | 5/1974 | Aagesen |
| 3,881,215 A | 5/1975 | Krier et al. |
| 4,092,789 A | 6/1978 | Arfons |

(Continued)

OTHER PUBLICATIONS

Elgin, "Elgin Pelican With Waterless Dust Control", Elgin Sweeper Company, 2009, 2 pages, Federal Signal Corporation, USA.

Primary Examiner — Michael Jennings
(74) Attorney, Agent, or Firm — Thorpe North & Western, LLP

(57) ABSTRACT

A particulate collection system comprises a chassis, supported by a plurality of rotatable actuators operable to provide mobility to the chassis and a blower motor, carried by the chassis. A cyclonic separation chamber is in fluid communication with an inlet head, the cyclonic separation chamber having: an inlet port in fluid communication with the inlet head, the inlet port passing through an upper portion of an outer wall of the cyclonic separation chamber to allow entry of gas into the cyclonic separation chamber; and a conical baffle, contained within the cyclonic separation chamber, the conical baffle having a lower diameter and an upper diameter, the upper diameter being smaller than the lower diameter, wherein gas enters an interior portion of the conical baffle through the lower diameter of the conical baffle and exits the cyclonic separation chamber through the upper diameter of the conical baffle.

13 Claims, 10 Drawing Sheets

(56) References Cited

U.S. PATENT DOCUMENTS

| | | | |
|---|---|---|---|
| 4,193,159 A | | 3/1980 | Beard, III |
| 4,227,893 A | | 10/1980 | Shaddock |
| 4,457,043 A | | 7/1984 | Oeberg et al. |
| 4,570,287 A | | 2/1986 | Kerschner et al. |
| 4,580,312 A | | 4/1986 | Van Raaij |
| 4,615,070 A | | 10/1986 | Frederick et al. |
| 4,951,342 A | | 8/1990 | Wilson |
| 5,030,259 A | | 7/1991 | Bryant et al. |
| 5,125,128 A | | 6/1992 | Davis |
| 5,983,447 A | | 11/1999 | Boomgaarden |
| 5,996,171 A | * | 12/1999 | Bowers ............... B01D 46/002 15/340.1 |
| 6,854,157 B2 | * | 2/2005 | Strauser ............... E01H 1/053 15/340.4 |
| 7,281,296 B2 | | 10/2007 | Strauser |
| 7,451,521 B2 | * | 11/2008 | Cappellotto ............ B60P 1/34 15/340.1 |
| 7,476,060 B2 | * | 1/2009 | Boroch ................ B65G 67/06 406/39 |
| 7,523,570 B2 | * | 4/2009 | Pobihushchy ........ E02F 3/8816 175/67 |
| 7,607,195 B2 | | 10/2009 | Tagliaferri |
| 8,919,391 B1 | * | 12/2014 | Harvey ............... B67D 7/0277 141/231 |
| 2005/0210623 A1 | | 9/2005 | Buckner |
| 2006/0236499 A1 | | 10/2006 | Cappellotto |
| 2008/0244859 A1 | | 10/2008 | Maybury |
| 2009/0293220 A1 | | 12/2009 | Mensch |
| 2010/0196129 A1 | * | 8/2010 | Buckner ................ E02F 3/94 414/467 |

* cited by examiner

FLUID COLLECTION SYSTEM AND RELATED METHODS

PRIORITY CLAIM

This is a divisional of U.S. patent application Ser. No. 13/160,039, filed Jun. 14, 2011, which is hereby incorporated herein by reference in its entirety.

BACKGROUND OF THE INVENTION

Field of the Invention

The present invention relates generally to the field of systems and methods used to collect or remove particulate materials from ground or floor surfaces. More particularly, the invention relates to mobile vehicles suitable for use in such applications.

Related Art

During many types of material handling, manufacturing and packaging processes, particulates of varying type can be released into the air and eventually accumulate in layers on flooring or ground surfaces. This problem can be exacerbated when the process at hand is undertaken inside of a closed building, as the particulates are essentially trapped within the building. While it is very often desirable to clean such accumulation in order to maintain a clean and safe working environment (or to recapture product that might otherwise be lost), doing so is often problematic. Using a manual, conventional broom-and-dustpan technique can result in a large cloud of fugitive particulates being dispersed into the air, which can cause a potentially hazardous situation for workers. Also, the fugitive particulates released into the air eventually settle on the flooring surface of areas after the cleaners have moved beyond those areas. Also, if the area or factory which is to be cleaned is very large, manually cleaning such a large space can be very time consuming and costly.

Due to these considerations, attempts have been made to generate automated devices to remove particulates from flooring and ground surfaces, such as vacuum vehicles that use moving brushes to sweep the particulates into a collection system. While such systems have proven, in certain circumstances, to be more cost effective and require fewer workers, they very often disperse the same amount of (or even more) fugitive particulates into the air than do manual cleaning processes. Also, such conventional systems have often proven ineffectual for indoor applications, as the machines are not easily maneuvered, and cannot be used to clean very near structures such as walls, equipment, etc.

SUMMARY OF THE INVENTION

In accordance with one aspect of the invention, a particulate collection system is provided, including a chassis, supported by a plurality of rotatable actuators operable to provide mobility to the chassis. A blower motor can be carried by the chassis. An inlet head can be carried by the chassis and can be in fluid communication with the blower motor, the blower motor creating a vacuum at the inlet head to cause particulates to be drawn into the collection system through the inlet head. A cyclonic separation chamber can be in fluid communication with the inlet head. The cyclonic separation chamber can have: an inlet port in fluid communication with the inlet head, the inlet port passing through an upper portion of an outer wall of the cyclonic separation chamber to allow entry of gas into the cyclonic separation chamber; and a conical baffle, contained within the cyclonic separation chamber, the conical baffle having a lower diameter and an upper diameter, the upper diameter being smaller than the lower diameter, wherein gas enters an interior portion of the conical baffle through the lower diameter of the conical baffle and exits the cyclonic separation chamber through the upper diameter of the conical baffle. When gas containing particulates is drawn through the inlet head and into the cyclonic separation chamber, at least some of the particulates contained in the gas are separated from the gas as the gas traverses the conical baffle within the cyclonic separation chamber.

In accordance with another aspect of the invention, a particulate collection system is provided, including a chassis, supported by a plurality of rotatable actuators to provide mobility to the chassis, and a blower motor, carried by the chassis. An inlet head can be carried by the chassis and can be in fluid communication with the blower motor. The blower motor can create a vacuum at the inlet head to cause particulates to be drawn into the collection system through the inlet head. A particulate collection chamber can be operable to collect at least some of the particulates contained within the gas drawn through the inlet head before the gas exits the system. The chassis can include a frontal portion and a rearward portion, and the inlet head can be disposed forwardly of the frontal portion of the chassis and forwardly of all components carried by the chassis. The inlet head can be removably coupled to the chassis, to enable interchanging of different inlet heads for use with the collection system.

In accordance with another aspect of the invention, a particulate collection system is provided, including a chassis, supported by a plurality of rotatable actuators to provide mobility to the chassis and a blower motor, carried by the chassis. An inlet head can be carried by the chassis and can be in fluid communication with the blower motor, the blower motor creating a vacuum at the inlet head to cause particulates to be drawn into the collection system through the inlet head. A particulate collection chamber can be operable to collect at least some of the particulates contained within the gas drawn through the inlet head before the gas exits the system. A primary power source can be carried by the chassis, and a hydraulic system can be powered by the primary power source. The hydraulic system can be used to power all operable components of the collection system.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

The following drawings illustrate exemplary embodiments for carrying out the invention. Like reference numerals refer to like parts in different views or embodiments of the present invention in the drawings. The drawings are not to be construed as limiting the present invention; they are merely provided as examples of various embodiments.

DETAILED DESCRIPTION

Figure 1:
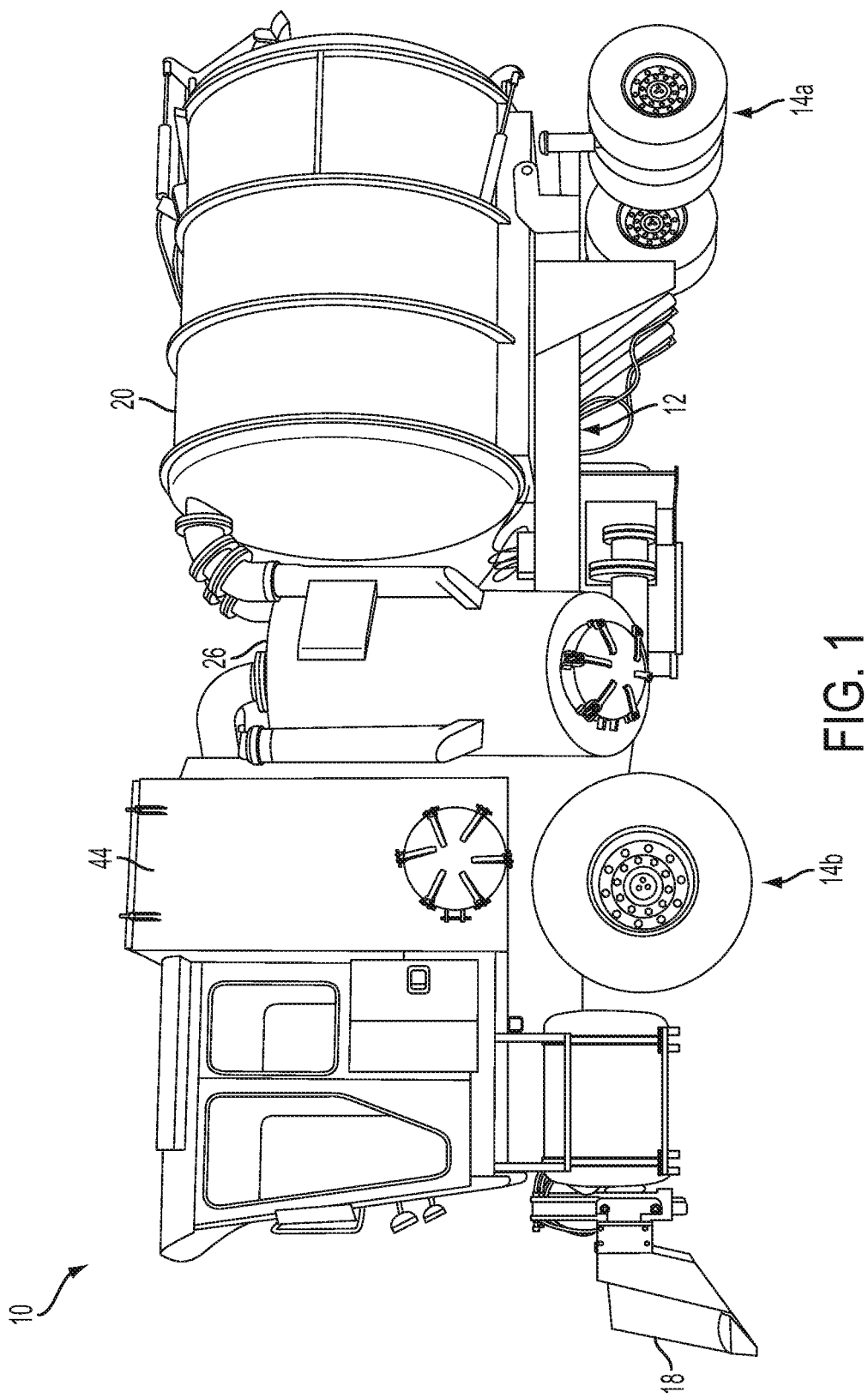
FIG. 1 is a side view of a fluid collection system in accordance with an embodiment of the invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

DEFINITIONS

As used herein, the singular forms "a" and "the" can include plural referents unless the context clearly dictates otherwise. Thus, for example, reference to "a chamber" can include one or more of such chambers.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Relative directional terms such as "higher," "lower," "forwardly," rearwardly," etc., are used to describe and claim various components of the systems described herein. Such terms are used to most clearly identify relative positions of various components being discussed. Unless the context of the present discussion clearly indicates otherwise, the use of such terms is not to be construed as limiting the present invention to any particular configuration.

As used herein, the term "fluid" is to be understood to refer to a variety of types of material including, without limitation, liquids, liquids containing particulates, gasses (such as air), gasses (including air) containing particulates, flowable masses of particulates, etc. While much of the discussion herein focuses on the use of the present system to collect "particulates," the present system is well suited for use in cleaning liquid spills, fluids which are combinations of liquids and particulates, etc.

The terms "upstream" and "downstream" are sometimes used herein to describe the direction in which fluid or gas flows through various components of the collection systems disclosed herein. It is to be understood that the fluid or gas flowing through the components of the system is doing so under some degree of pressure (or negative pressure). Thus, fluids or gas can flow "downstream" from a first component to a second component, even though such second component is higher in elevation, or is positioned more frontwardly on a vehicle, than is the first component. In other words, fluids or gas can flow upstream or downstream between two components regardless of the physical position of such components relative to one another or to other components of the system.

Invention

The present invention relates generally to systems for use in collecting or reclaiming fluid or particulate matter. While the present invention can be utilized in either or both fluid or particulate matter collection, the following discussion will focus primarily on use of the system to collect particulates. However, such focus should not be construed as limiting the invention to use only with particulate collection. Such particulate matter can be created, for example, when processing or packaging pelletized materials such as fertilizer, feedstock and the like. During such processes, the material being handled can settle in a layer on ground or flooring surfaces in a manner that is very difficult to clean. Cleaning the flooring or ground surfaces, however, is generally required in order to maintain a sanitary and safe work environment, and (in some cases) to reclaim valuable materials that can be later re-used or recycled.

The present invention provides systems and methods that provide optimal removal of particulate matter from flooring or ground surfaces while greatly diminishing the release of so-called "fugitive" particulate matter into the air. In accordance with one embodiment of the invention, shown generally throughout the figures and in totality in FIG. 1, the system provides a particulate collection system 10 that includes a chassis 12 that can be supported by a plurality of rotatable actuators 14a, 14b, etc. The plurality of rotatable actuators can be operable to provide mobility to the chassis to allow the system to be moved about various areas to remove particulate from floor and ground surfaces of the areas. While the rotatable actuators shown in the figures comprise wheels, it is to be understood that they can also be rotatable drive belts, drive tracks, etc., as would be appreciated by one of ordinary skill in the art having possession of this disclosure.

The collection system can include a blower motor (shown schematically at 16 in FIG. 2) that can also be carried by the chassis. An inlet head (18 in FIGS. 1-3) can also be carried by the chassis and can be in fluid communication with the blower motor. During operation, the blower motor creates a vacuum that causes airflow throughout the various components of the system, which results in particulates being drawn into the inlet head, and through the remaining components of the system to collect or remove the particulates from the floor or ground surface over which the system is moved.

The system can be used in a variety of applications, including road cleaning applications, factory floor cleaning operations, and the like. In one embodiment, however, the system is best suited for use in areas in which layers of particulates have collected on flooring surfaces, such as manufacturing factories, packaging facilities and the like. Operation of the system is illustrated schematically in FIG. 2. Here, the various components of the system are shown to illustrate the direction of airflow through the system and not necessarily as the components are positioned relative to one another on the chassis 12. A negative pressure is created throughout the system by operation of blower or pump 16. The resulting negative pressure causes a vacuum to be created in the inlet head 18, which causes gas or air containing particulates from the area adjacent flooring surface 19 to be drawn into the inlet head.

After being drawn into the inlet head, the gas or air containing the particulates is first routed through an initial particulate collection chamber 20 which is located downstream of the inlet head. Inlet port 22 draws the gas or air containing particulates into the initial collection chamber, where at least some of the particulates are allowed to accumulate on the bottom or floor of the initial collection chamber. The gas or air then flows through outlet port 24, typically containing less of the particulates than the gas or air entering the initial collection chamber.

After leaving the initial collection chamber, the gas or air is drawn into a cyclonic separation chamber 26 by way of inlet port 28. The cyclonic separation chamber serves to remove further particulates from the gas or air. Generally speaking, the gas or air enters port 28 and flows around and through a conical baffle 30 which is contained within the cyclonic separation chamber. The conical baffle includes a lower diameter 32 and an upper diameter 34. The upper diameter is generally smaller than the lower diameter, and the upper diameter is generally positioned at or near the same elevation as the inlet port 28.

The cyclonic separation chamber 26 includes a series of upper openings or ports 36 and a series of lower openings or ports 38 formed in an outer wall thereof. Each of a series of conduits 40 can connect an upper opening with a lower opening externally of the cyclonic separation chamber. Thus, as the air or gas enters the cyclonic chamber at 28, it traverses the outer surface of the conical baffle 30 and continues to flow downward as it does. Due to the centrifugal force caused by circulating the airflow, heavier particulates contained in the gas or air are captured at the bottom of the cyclonic chamber in at least two ways. Firstly, some of the particulates fall out of the gas or air as the air is circulated within the cyclonic chamber and the particulates are driven against the internal walls of the cyclonic chamber. Secondly, some of the particulates are forced into the upper openings 36, pass through the conduits 40, and reenter the cyclonic separation chamber through the lower openings 38 to thereby be collected on the lower surface of the cyclonic separation chamber.

Figure 2:
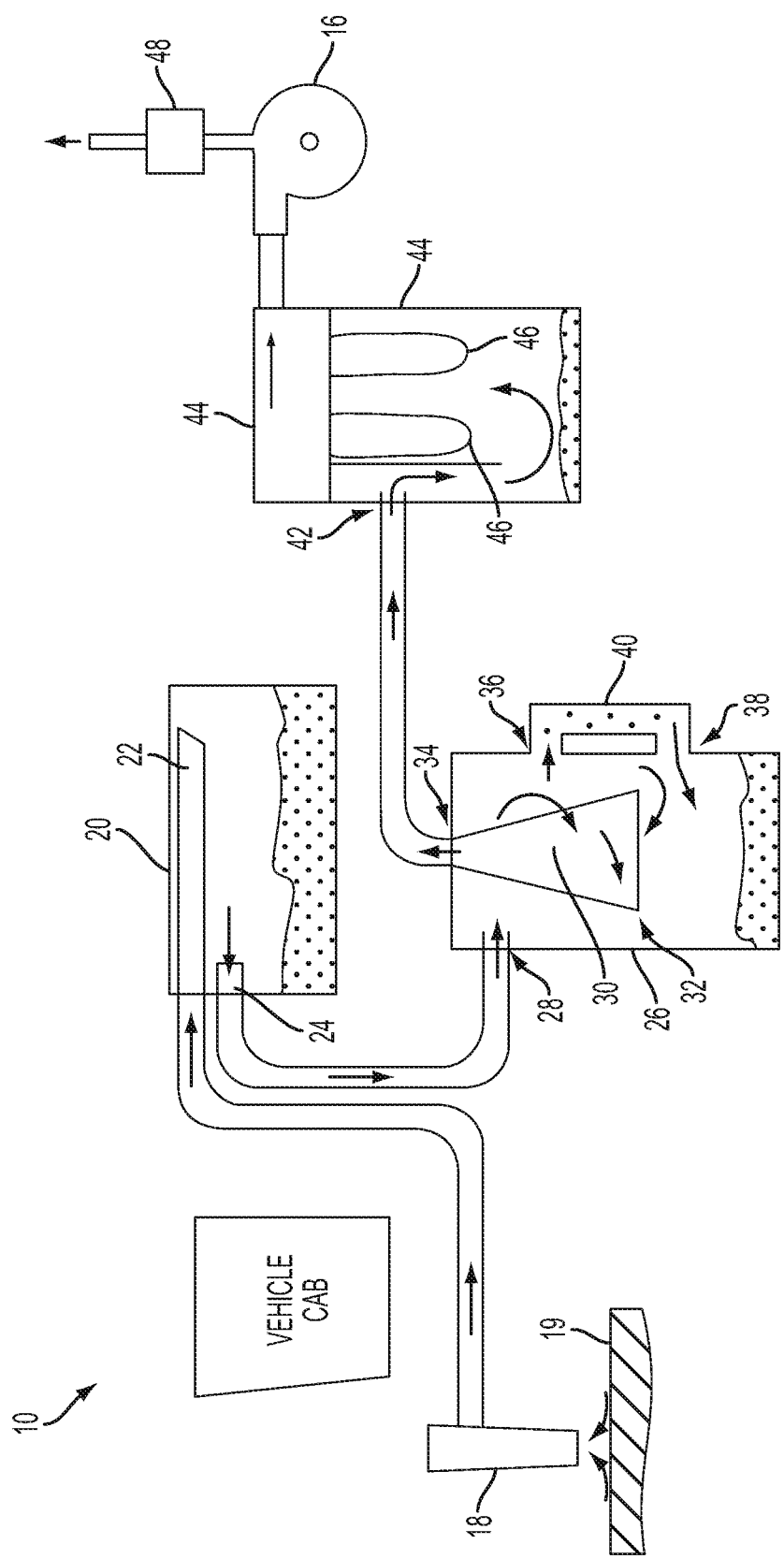
FIG. 2 is schematic representation of the directional flow of fluid or gas through various components of the collection system of FIG. 1.
Figure 6:
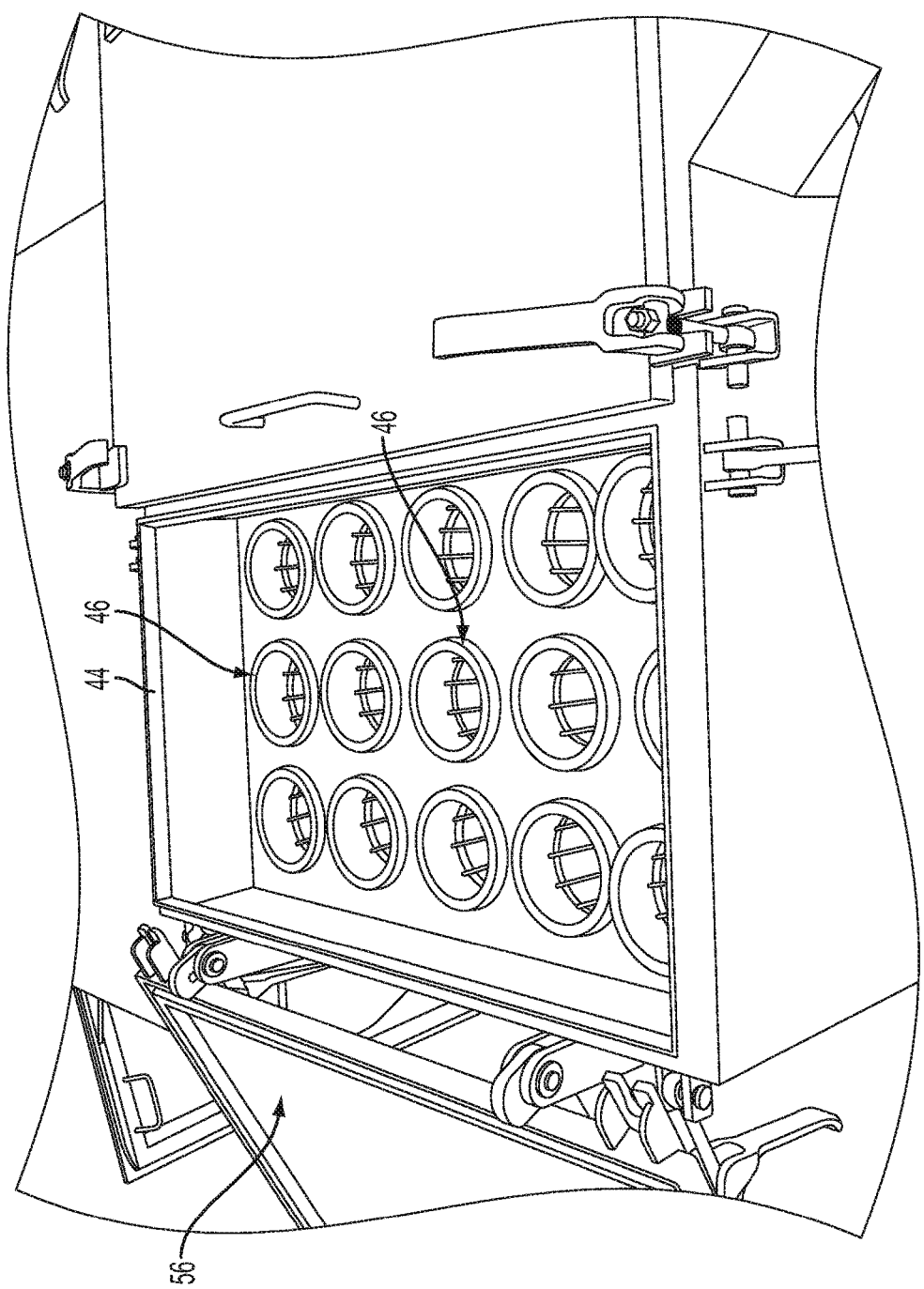
FIG. 6 is a perspective view of an interior portion of the baghouse filter chamber of the collection system of FIG. 1.

After the air or gas circulates within the cyclonic chamber 26, it is drawn up through the center of the conical baffle 30 and exits through a port that is near (or that comprises) the smaller, upper diameter 34 of the conical baffle. After the air or gas has flowed through the initial collection chamber 20 and the cyclonic separation chamber 26, much of the particulates originally contained within the gas or air have been removed from the air or gas. The gas or air is then drawn through inlet 42 into a baghouse filter chamber 44, which is located downstream of the cyclonic separation chamber. The baghouse filter chamber can include at least one filter 46 contained therein (two are shown in the example of FIG. 2—fifteen are shown in the example of FIG. 6). The filters serve to scrub the gas or air one final time, after which the gas or air can be dispelled from the system through muffler or silencer 48.

Thus, once the gas or air has completed its route through the system 10, it has been substantially completely cleaned of particulates. In addition, particulate accumulation has occurred in the bottoms of the initial collection chamber 20, the cyclonic separation chamber 26 and the baghouse filter chamber 44. As shown in the figures, the system can include cleanout access ports that allow for recovery of the particulates accumulated in the various collection chambers. Once retrieved from the various collection chambers, the particulate material can be reused, recycled or discarded, whichever is most suitable for the particulate at hand.

Figure 3:
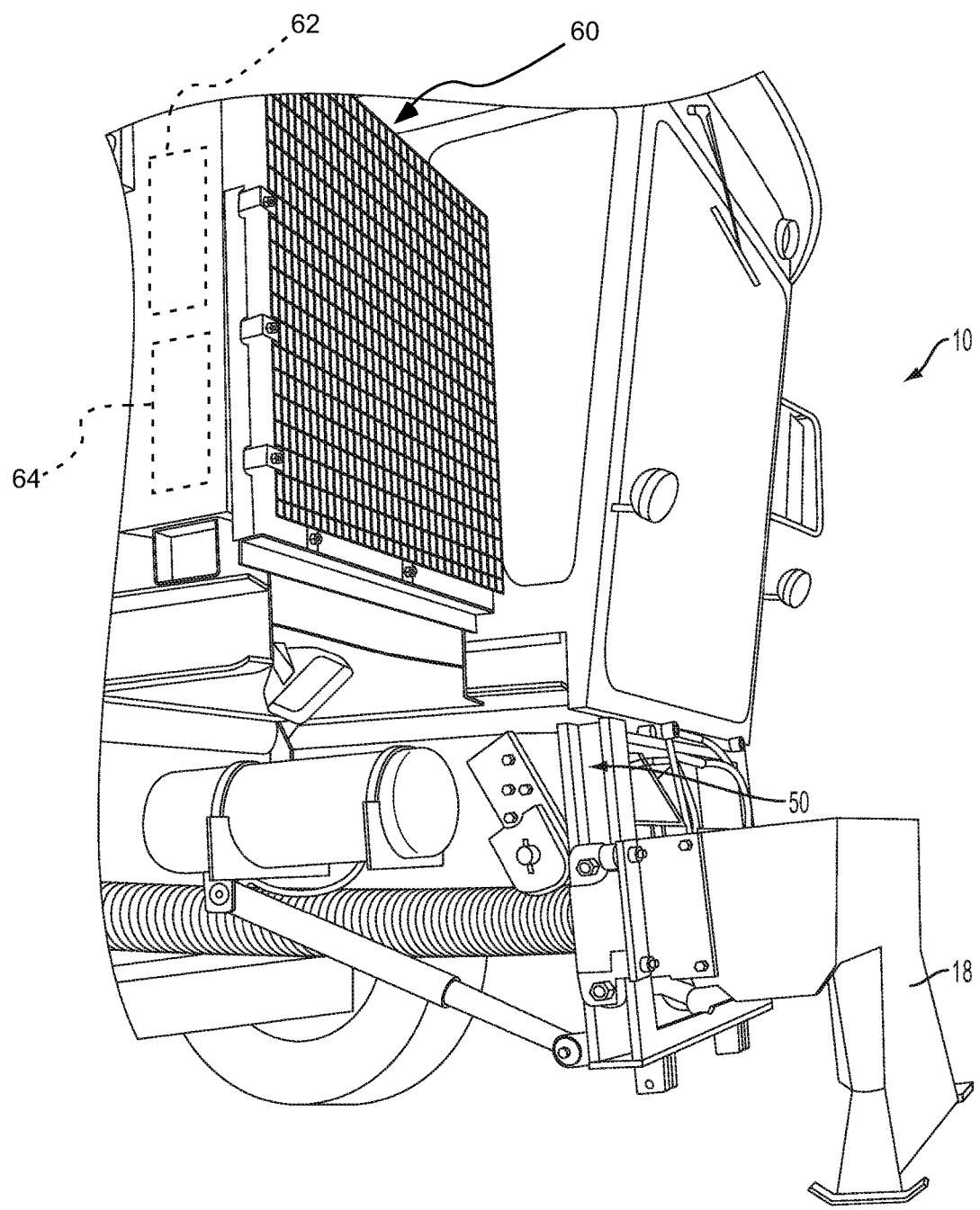
FIG. 3 is a side, front perspective view of the collection system of FIG. 1, showing an inlet head in more detail.

FIG. 3 illustrates a more detailed view of the inlet head 18 of the collection system. The inlet head can be carried by rails 50 that can allow the head to be moved upwardly and downwardly for optimal performance for any particular application. In addition, the inlet head can be removably connected to the rails, such that different inlet heads can be quickly and easily interchanged to adapt the system for various applications. As will be appreciated from FIG. 3, in one exemplary embodiment, the inlet head is positioned forwardly of all components of the system 10. In this manner, movement of the wheels, or movement of the system itself, does not tend to disturb particulates laying on a floor surface before the particulates are drawn into the inlet head. In this manner, far fewer fugitive particulates are dispersed into the air during operation of the device, as compared to conventional systems.

Figure 4:
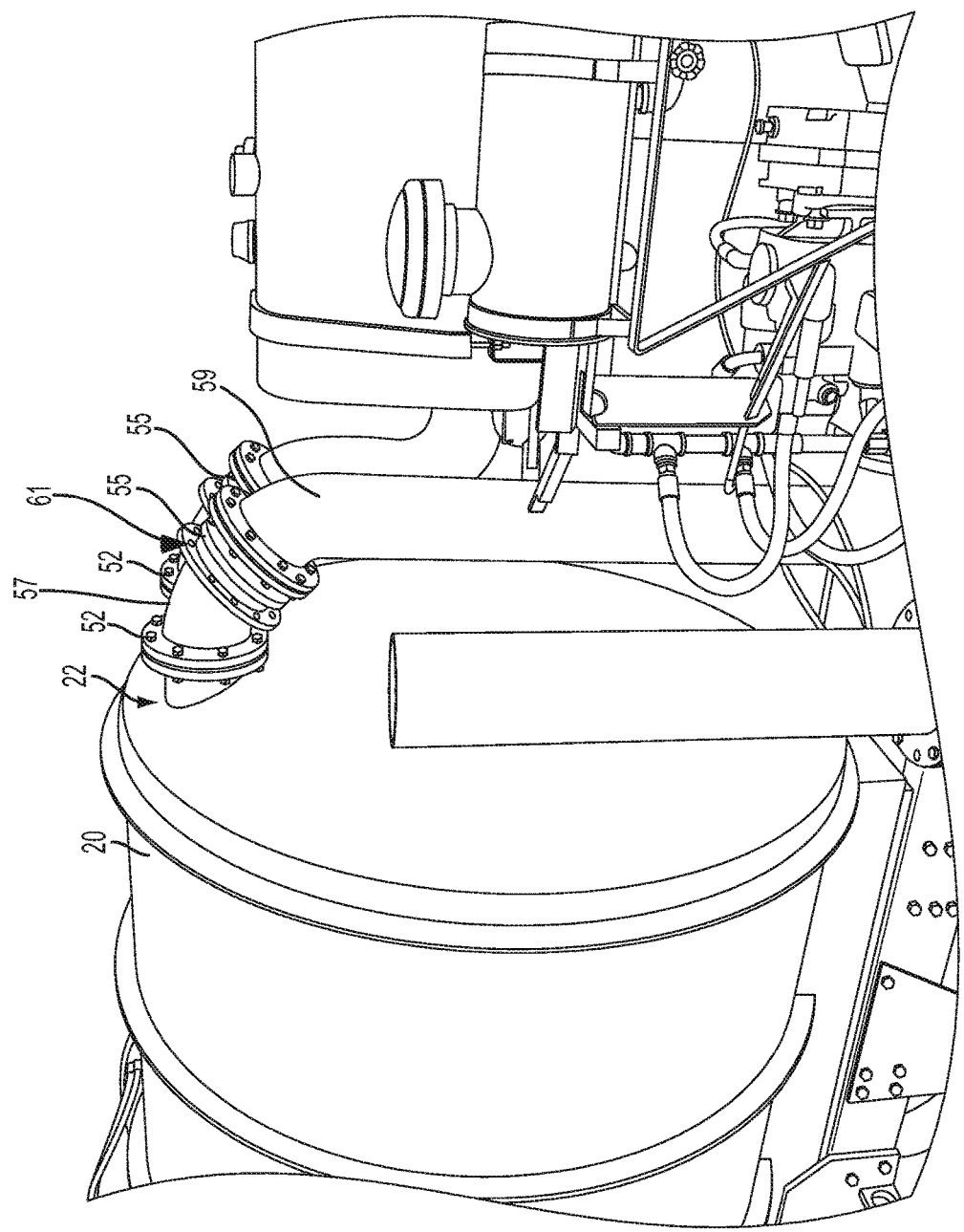
FIG. 4 is a perspective, partial side view of an initial collection chamber of the collection system of FIG. 1.

FIG. 4 includes a side view of the inlet 22 port of the initial collection chamber. As will be appreciated from the drawing, the inlet and outlet ports can be removably coupled to various conduit sections by way of removable fasteners 52 (e.g., bolts, nuts, clamps, etc.). In this manner, the inlet and outlet ports (and the initial collection chamber as a whole) can be relatively easily disconnected from the conduits coupled to the remaining components of the system. The use of removable fasteners and flanges to couple the numerous conduit sections one to another can be beneficial for a number of reasons. In one embodiment, the removable connections can be used to easily change out sections of conduit (particularly where turns occur in the travel path of particulates) where such sections become worn due to impingement of particulates on internal portions of the conduit. In other embodiments, the sections can be relatively easily separated from one another if the conduit requires cleaning.

Figure 9:
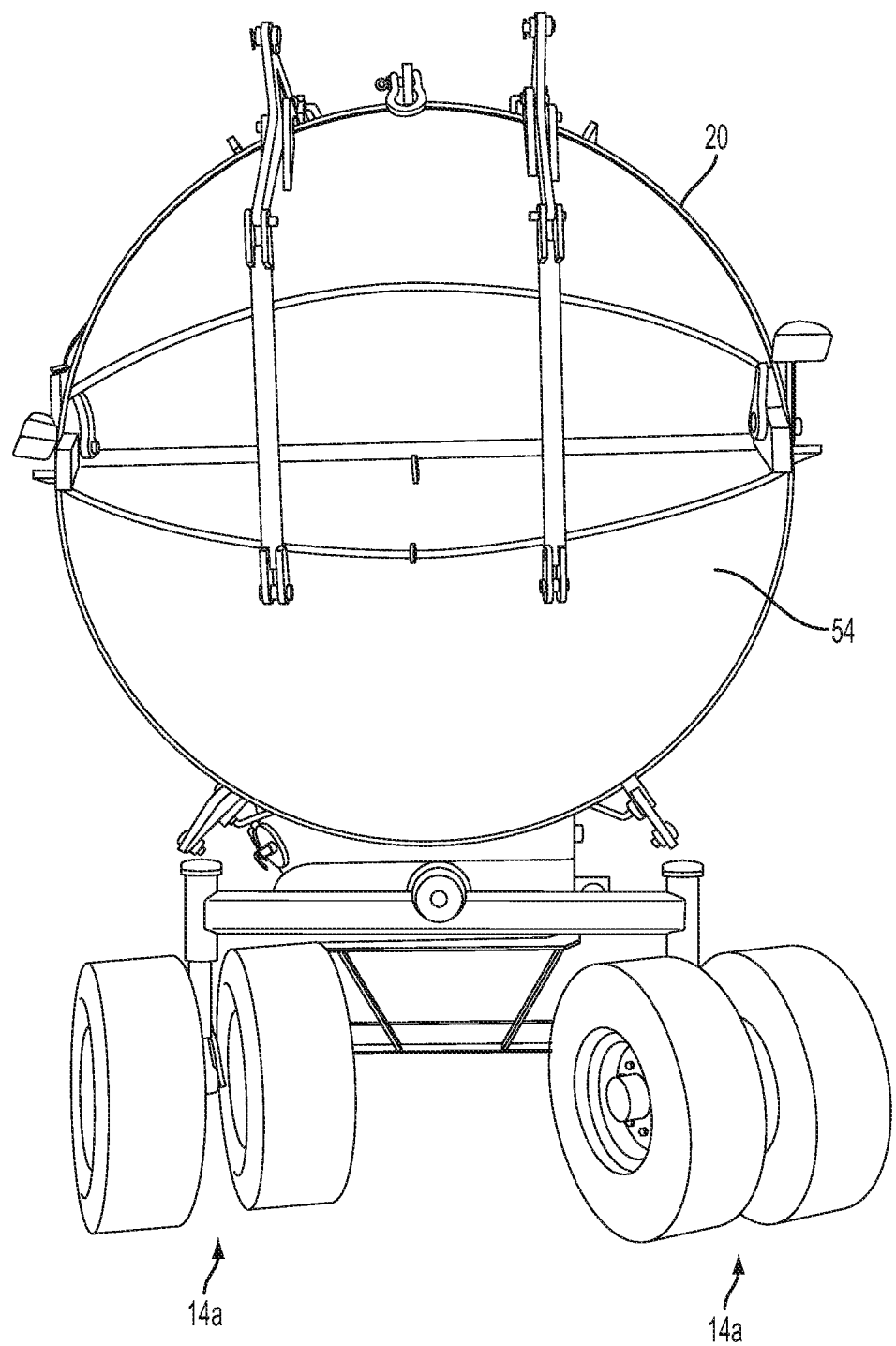
FIG. 9 is a rear, end view of the collection system of FIG. 1.
Figure 10:
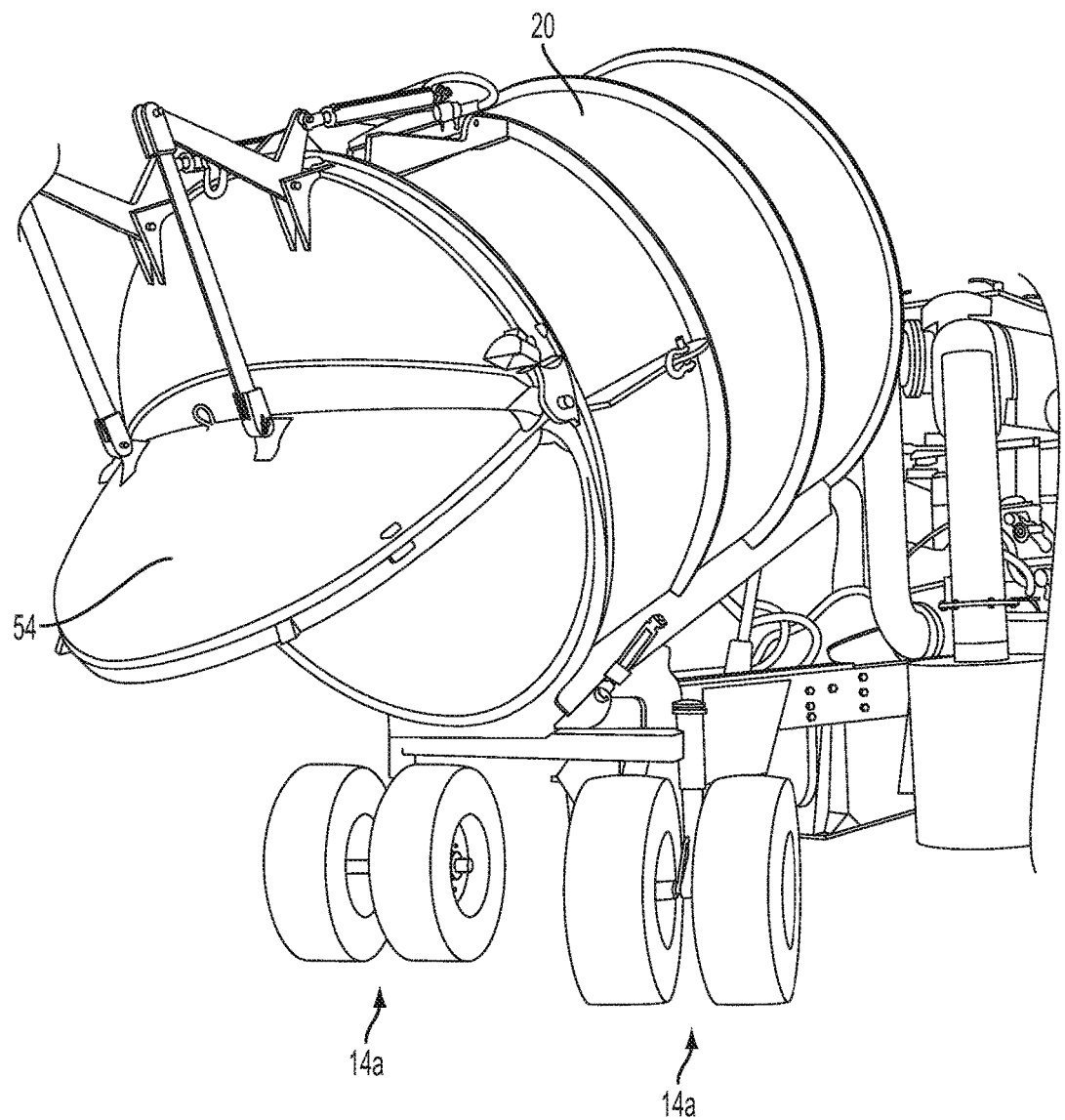
FIG. 10 is a rear, side perspective view of the collection system of FIG. 1, shown with the initial collection chamber in an opened position to facilitate removal of collected particulates from the system.

In one exemplary aspect of the invention, joints between various conduit sections can be sealed by the use of expansion joints (55 in FIGS. 4 and 5) that do not require fasteners to create a seal between conduit sections. Instead, these joints can be compressed between two conduit sections (e.g., between sections 57 and 59 in FIG. 4) to form an air-tight seal that can be broken (or opened) by simply moving the conduit sections away from one another. For example, as shown in FIGS. 9 and 10, the initial collection tank can include a pivotal closure 54 that can be opened to allow access to clean the interior of the initial collection chamber. In the configuration shown in FIG. 10, the initial particulate collection chamber is tilted back and away from the remaining portions of the system.

By using the expansion joints 55 between conduit sections 57 and 59 (on each of the inlet and outlet lines to the collection chamber), the initial collection chamber can be simply tipped backward (by way of hydraulic actuators). This results in sections 57 and 59 separating from one another, but does not require that any removable fasteners be removed or uncoupled prior to tipping back the tank. Tipping the tank backwardly allows easier cleaning and/or dumping of the initial collection chamber 20. One or more alignment pins (not shown in detail) can be carried by the expansion joint and can be seated within orifices 61 (FIG. 4) in the flange of conduit section 57 to provide for proper alignment of the conduit sections on either side of the expansion joints. While the type of expansion joint used can be varied to suit particular applications, in one aspect of the invention, expansion joints currently sold under the PROCO brand can be utilized.

Figure 5:
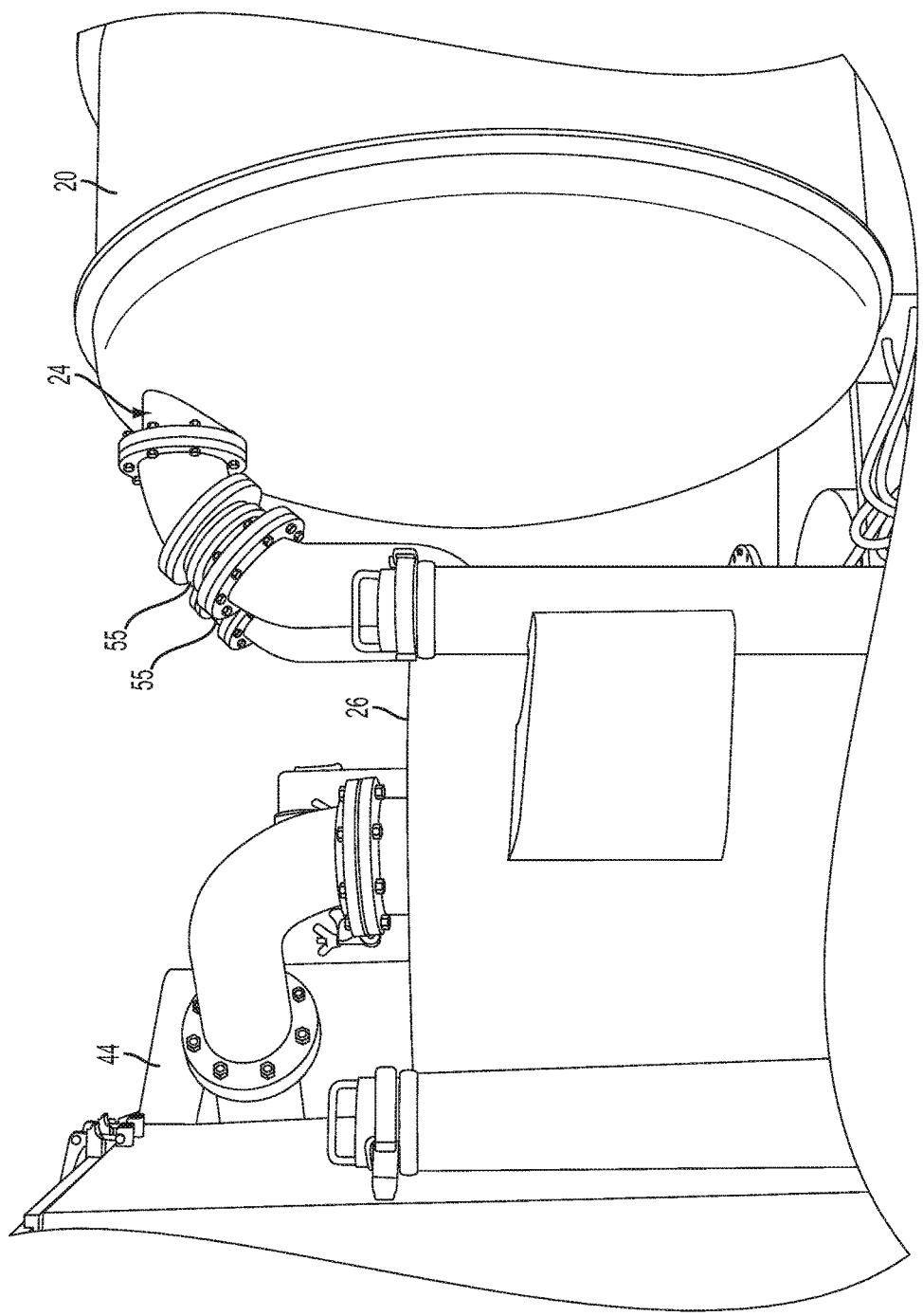
FIG. 5 is a perspective view of various conduits connecting an initial collection chamber, cyclonic separation chamber and baghouse filter chamber of the collection system of FIG. 1.

As shown in FIG. 5, similar removable fasteners can be used to couple cyclonic separation chamber 26 to the baghouse filter chamber 44. As shown in FIG. 6, the baghouse filter chamber 44 can include a removable lid 56 that can pivot open to provide access to filters 46 to allow an operator to clean and/or replace the filters. While a specific number of filters is shown in FIG. 6, it is to be understood that the number of filters used can be varied depending upon the particulate being collected, the type of filter used, etc. While not so limited, in the example shown in FIG. 6, fifteen filters of the type sold by Vactor Manufacturing can be utilized. In one aspect of the invention, twenty-nine filters in total are used within the baghouse filter chamber.

Figure 7:
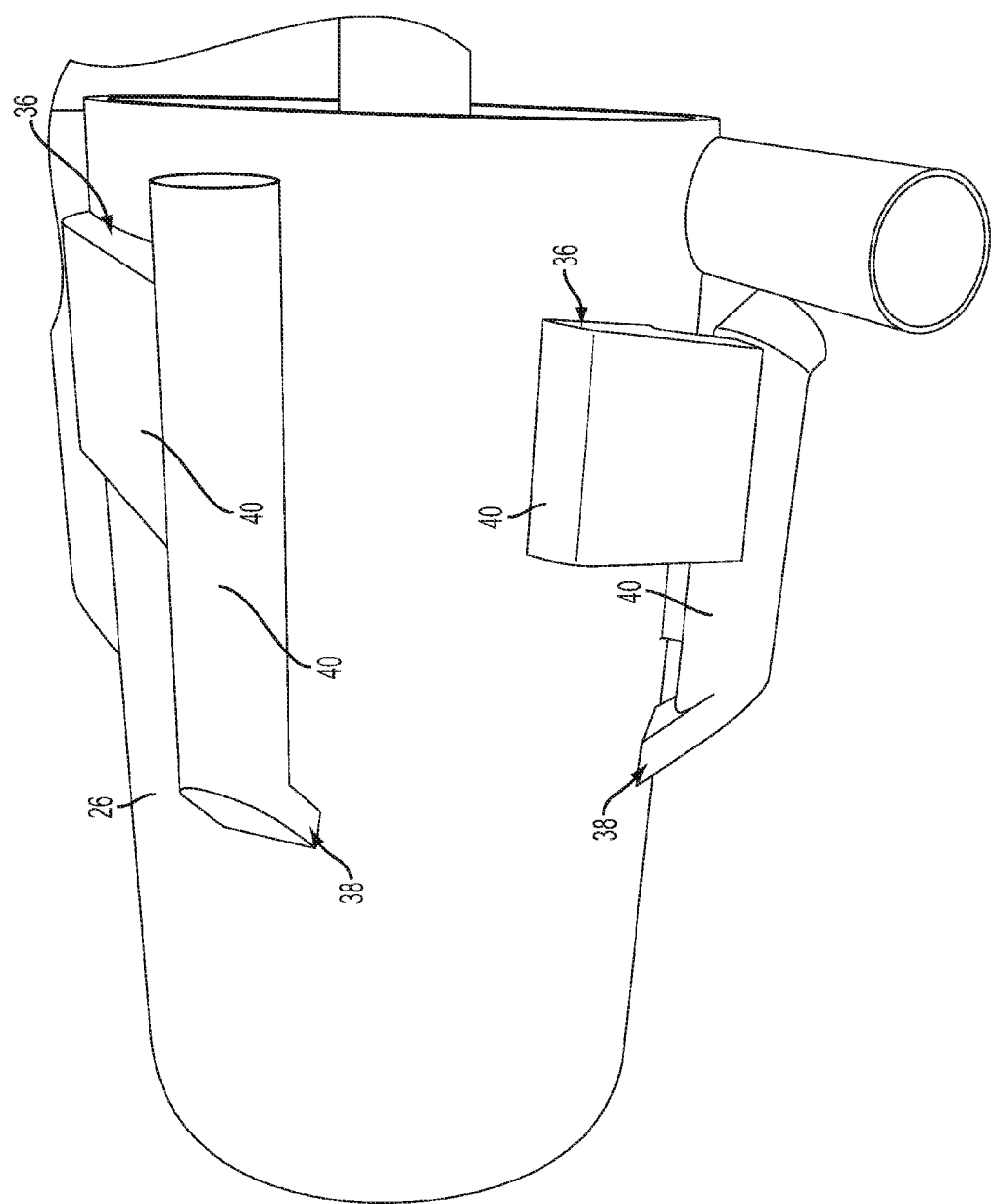
FIG. 7 is a side view of the cyclonic separation chamber of the collection system of FIG. 1 (shown removed from the system)
Figure 8:
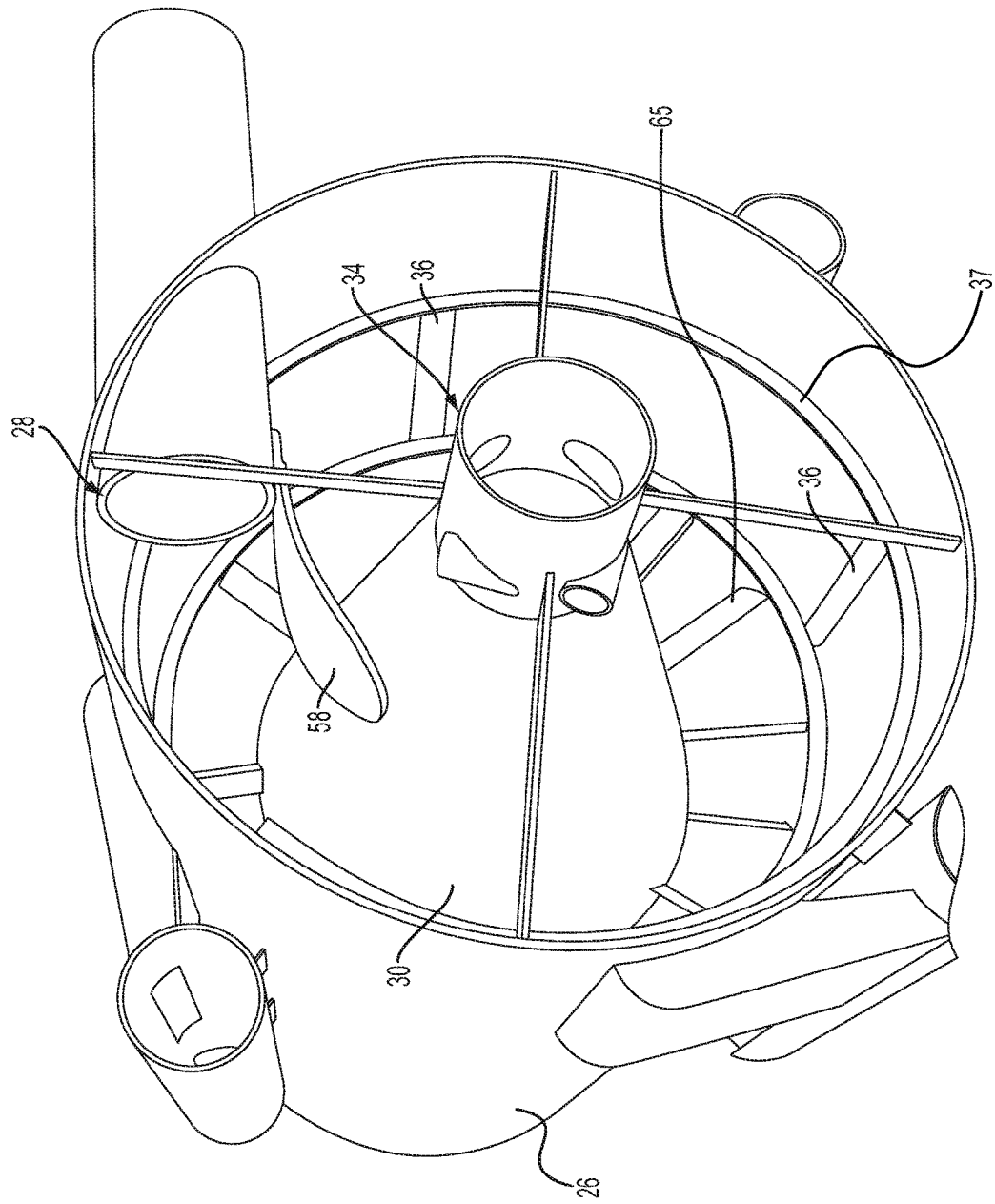
FIG. 8 is top perspective view of the cyclonic separation chamber of FIG. 1 (shown removed from the system)

Turning now to FIGS. 7 and 8, more details of the cyclonic collection chamber will be described. FIG. 8 provides a more detailed view of the conical baffle 30, and the inlet 28 and outlet 34 ports. Upper openings 36 are also shown in FIG. 8, which allow entry of particulates into the conduits 40 that connect the upper openings 36 to the lower openings 38. The lower openings 38 are shown schematically in FIG. 2, and are positioned as shown in FIG. 7 beneath the lower portion of conduit 40. It will be appreciated from FIG. 7 that each of the series of upper openings and lower openings are arranged in pairs: the lower opening of each pair is disposed radially forward of the upper opening of each pair. In this manner, the airflow which is naturally circulated radially within the cyclonic separation chamber 26 maintains at least some of its forward momentum when traveling through the conduits 40 and reintroducing particulates into the chamber via lower openings 38.

As will be appreciated from FIG. 8, a deflection baffle 58 can be positioned adjacent the inlet port 28 to aid in creating circular airflow within the chamber. The deflection baffle also aids in creating or maintaining a channel of airflow adjacent the upper portion of the chamber as the air or gas containing the particulates enters the chamber 26, thus increasing the likelihood that particulates contained in the air or gas will enter one of the upper openings 36. In other words, the deflection baffle serves to maintain airflow longer in a circular direction adjacent the upper openings as the air or gas enters the chamber 26.

As also illustrated in FIG. 8, in one embodiment of the invention, the separation chamber 26 can include an axial baffle 37 that is coupled to, and extends around, the inner wall of the separation chamber. The axial baffle typically begins adjacent the inlet port 28 near an upper portion of said port, and helically extends around and down the inner wall. At an uppermost elevation, the axial baffle is positioned above (or coincident with an upper portion of) one or more of the upper openings 36. After one or more helical rotations, the axial baffle has lowered in elevation so as to be adjacent lower portions of one or more of the upper openings. The axial baffle generally extends outwardly from the inner wall about one to three inches (e.g., it includes a width of about one to three inches). In some embodiments, the axial baffle can extend further than three inches, as a particular application may dictate. Thus, the axial baffle serves to prevent or limit particulates that are traveling along the inner wall of the separation chamber from falling past (or between) the upper openings: instead, the particulates contact the axial baffle and then flow either directly into one of the upper openings, or flow along the axial baffle until an upper opening is encountered, and then flow into the upper opening.

As also illustrated in FIG. 8, one or more lower baffles 65 can be used to couple the conical baffle 30 to the internal wall of the separation chamber 26. These lower baffles can be angled upwardly, to induce airflow downwardly into the lower portion of the cyclonic separation/collection chamber, to increase circulation of the air or gas containing the particulates within the separation chamber.

The mechanism utilized to power the various components of the system 10 can be any of a variety of types that would occur to one of ordinary skill in the art having possession of this disclosure. In one embodiment, however, the system includes a primary power source (not shown schematically at 62 in FIG. 3, behind grill 60 in detail), such as a diesel, gasoline, or propane engine. In one exemplary application, the primary power source is a 300 horsepower Cummins NT-855. This primary power source powers a secondary, conventional hydraulic system (not shown schematically at 64 in FIG. 3, behind grill 60 in detail) that can in turn power substantially all of the various operating components of the system. This, of course, is only one example of a variety of suitable primary power sources that can be utilized.

In one aspect of the invention, the hydraulic system is used to power drive wheels 14b (FIG. 1). The drive wheels can each be independently controllable to move the system both backward and forward. In this manner, so-called "skid steering" can be provided to the system, in which one of wheels 14b turns one direction while the complementary wheel 14b (on the opposite side of the system) turns the other direction. Thus, the system can be maneuvered very accurately and carefully to provide access to floor or ground surfaces that could not be reached by conventional systems. While not so required, in this configuration, the rear wheels 14a (FIG. 1, FIG. 9 and FIG. 10) can be simply pivot wheels that allow the rear end of the system to track with the drive wheels 14b.

Several advantages are provided by utilizing a secondary hydraulic system to power substantially all of the various operating components of the system. For example, such a system provides superior handling for the "skid-steer" aspect of the drive wheels or track. Also, the effectiveness of any vacuum operation will be dependent upon several factors, two of which are: travel speed (and hence dwell time over the surface to be cleaned); and, vacuum (air/gas speed and air/gas volume) at the point adjacent the inlet head 18. By controlling the components that impact these aspects with a hydraulic system, the machine travel speed can be varied independently of the blower rotational speed. In such case, either of the blower speed (e.g., vacuum power) and vehicle speed (e.g., wheel or track velocity) may be independently increased or decreased on demand by the operator as the need arises to best collect the particulates in any specific environment.

Generally speaking, the primary power source can be set to an optimal RPM for its particular power range, after which any other power settings can be varied hydraulically as needed by the operator. With a conventional "mechanical drive train-type" system, machine travel speed in any particular gear will be governed by the engine speed. If the blower were also driven by this conventional engine, blower speed would naturally increase or decrease along with the machine travel speed.

Also, the hydraulic system can be used to raise and lower the collection chamber 20, open and close the door 54 of the collection chamber, and position the inlet head 18. If a rotating broom were incorporated with, or placed adjacent, the inlet head, the hydraulic system can be used to optimize the rotation speed of the broom, and to position the broom upwardly and downwardly. Also, the hydraulic system can be used by other accessories (perhaps added on to the base model) by easily tapping into hydraulic ports (not shown in detail) positioned for such access.

While the present invention has been described having varying components described in varying positions relative to the order in which an audio signal can be processed, in some embodiments of the invention, the order in which the audio signal is processed can significantly affect the performance of the systems. Thus, some (but not all), claimed embodiments are limited to the precise components recited, and can be limited to processing an audio signal in the precise step-wise order in which the components are claimed or shown. Similarly some (but not all) of the methods claimed or described herein are limited to the precise step-wise order in which the process steps are recited.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the examples.

I claim:

1. A fluid collection system, comprising:
a chassis, supported by a plurality of rotatable actuators operable to provide mobility to the chassis;
a blower motor, carried by the chassis;
an inlet head, carried by the chassis and being in fluid communication with the blower motor, the blower motor creating a vacuum at the inlet head to cause fluid to be drawn into the collection system through the inlet head; and
a cyclonic separation chamber, in fluid communication with the inlet head, the cyclonic separation chamber having:
an inlet port in fluid communication with the inlet head, the inlet port passing through an upper portion of an outer wall of the cyclonic separation chamber to allow entry of fluid or gas into the cyclonic separation chamber; and
a conical baffle, contained within the cyclonic separation chamber, the conical baffle having a lower diameter and an upper diameter, the upper diameter being smaller than the lower diameter, wherein fluid or gas enters an interior portion of the conical baffle through the lower diameter of the conical baffle and exits the cyclonic separation chamber through the upper diameter of the conical baffle;
wherein fluid or gas containing particulates is drawn through the inlet head and into the cyclonic separation chamber such that at least some of the particulates contained in the fluid or gas are separated from the fluid or gas as the fluid or gas traverses the conical baffle within the cyclonic separation chamber.

2. The system of claim 1, wherein the inlet port passing through the outer portion of the cyclonic separation chamber is positioned distally from the lower diameter of the conical baffle.

3. The system of claim 2, wherein the fluid or gas containing particulates enters the cyclonic separation chamber adjacent the upper diameter of the conical baffle, traverses an outer wall of the conical baffle, and passes through an internal portion of the conical baffle as it exits the cyclonic separation chamber through the upper diameter of the conical baffle.

4. The system of claim 1, further comprising: a series of upper openings and a series of lower openings formed in the outer wall of the cyclonic separation chamber; and a series of conduits, each of the conduits connecting an upper opening with a lower opening externally of the cyclonic separation chamber.

5. The system of claim 4, wherein at least some of the particulates contained within the fluid or gas entering the cyclonic separation chamber are forced into the upper openings, pass through the conduits, and reenter the cyclonic separation chamber through the lower openings to thereby be collected on a lower surface of the cyclonic separation chamber.

6. The system of claim 4, wherein the series of upper openings and lower openings are arranged in pairs, and wherein each lower opening of each pair is disposed radially forward of each upper opening of each pair.

7. The system of claim 1, further comprising an initial particulate collection chamber, located upstream of the cyclonic separation chamber, the initial particulate collection chamber being operable to collect at least some of the particulates contained within the fluid or gas drawn through the inlet head before the fluid or gas reaches the cyclonic separation chamber.

8. The system of claim 1, further comprising a baghouse filter chamber, located downstream of the cyclonic separation chamber, the baghouse filter chamber having at least one filter disposed therein, the at least one filter operable to filter the fluid or gas drawn in through the inlet head prior to expelling the fluid or gas from the system.

9. The system of claim 1, wherein the plurality of rotatable actuators comprise wheels, and wherein at least one of the wheels includes at least one drive wheel that is driven by a power source carried by the chassis to provide mobility to the chassis.

10. The system of claim 9, wherein the plurality of rotatable actuators comprise wheels, at least two of which are drive wheels that are each capable of propelling the chassis frontwardly and rearwardly independently of the other, to allow the drive wheels to cause the chassis to turn without angling the drive wheels relative to the chassis.

11. The system of claim 1, wherein the chassis includes a frontal portion and a rearward portion, and wherein the inlet head is disposed forward of the frontal portion of the chassis, and forwardly of all components carried by the chassis.

12. The system of claim 1, wherein the inlet head is removably coupled to the chassis, to enable interchanging of different inlet heads for use with the system.

13. The system of claim 1, further comprising a primary power source, carried by the chassis, and a hydraulic system powered by the primary power source, wherein the hydraulic system is used to power all operable components of the collection system.

* * * * *